(12) United States Patent
Huang

(10) Patent No.: US 11,692,697 B2
(45) Date of Patent: Jul. 4, 2023

(54) PHOTORECEPTOR MOUNTING BASE AND LAMP

(71) Applicant: Qing Huang, Wan Chai (HK)

(72) Inventor: Qing Huang, Wan Chai (HK)

( * ) Notice: Subject to any disclaimer, the term of this patent is extended or adjusted under 35 U.S.C. 154(b) by 0 days.

(21) Appl. No.: 17/503,017

(22) Filed: Oct. 15, 2021

(65) Prior Publication Data
US 2023/0046017 A1    Feb. 16, 2023

(30) Foreign Application Priority Data
Aug. 16, 2021    (CN) .......................... 202110938801.2

(51) Int. Cl.
| | |
|---|---|
| F21V 23/04 | (2006.01) |
| F21V 23/00 | (2015.01) |
| G01D 11/24 | (2006.01) |
| G01D 11/28 | (2006.01) |
| F21V 17/08 | (2006.01) |

(52) U.S. Cl.
CPC .......... *F21V 23/0464* (2013.01); *F21V 17/08* (2013.01); *F21V 23/003* (2013.01); *G01D 11/24* (2013.01); *G01D 11/28* (2013.01)

(58) Field of Classification Search
CPC .... F21V 17/08; F21V 23/003; F21V 23/0464; F21V 23/0442; G01D 11/24; G01D 11/245; G01D 11/28; H02S 20/20
See application file for complete search history.

(56) References Cited

U.S. PATENT DOCUMENTS

| | | | | |
|---|---|---|---|---|
| 2008/0007942 A1* | 1/2008 | Ruggles | ................. | F21S 8/033 362/147 |
| 2019/0186719 A1* | 6/2019 | Mostoller | ............... | F21V 21/15 |
| 2021/0384669 A1* | 12/2021 | Mugan | .................... | F21V 23/06 |

FOREIGN PATENT DOCUMENTS

| | | | | | |
|---|---|---|---|---|---|
| EP | 2273188 A2 | * | 1/2011 | ............. | F21V 17/02 |
| JP | 2013195474 A | * | 9/2013 | ........... | G02B 27/281 |
| WO | WO-2021247873 A1 | * | 12/2021 | ............. | F21V 17/02 |

* cited by examiner

*Primary Examiner* — Alan B Cariaso

(57) ABSTRACT

Embodiments of the present application relate to the technical field of lamps, and in particular, disclose a photoreceptor mounting base and a lamp. A photoreceptor mounting base includes a housing and a rotation member. The housing is provided with a receiving cavity and an opening that communicates with the receiving cavity. The rotation member is received in the receiving cavity and is rotatably connected to the housing. The rotation member is configured to mount a photoreceptor, and a part of the photoreceptor is exposed to the opening. By means of the preceding modes, the embodiments of the present application can implement: through the rotation of the rotation member, the rotation of the photoreceptor can be implemented; a photoreceptive lens disposed on an exposed part of the photoreceptor can rotate around an axis of the rotation member, so as to implement accurate induction of changing light rays outside by the photoreceptor.

8 Claims, 5 Drawing Sheets

PHOTORECEPTOR MOUNTING BASE AND LAMP

TECHNICAL FIELD

Embodiments of the present application relate to the technical field of lamps, and in particular, to a photoreceptor mounting base and a lamp.

BACKGROUND

Outdoor lamps, such as street lamps, navigation lamps, indicator lamps, and signal lamps, are generally provided with a photoreceptor to sense changes of external light rays, so as to adjust lighting intensity, light ray angle, and the like of the lamps. In many cases, the direction or position of the photoreceptor needs to be adjusted, to accurately receive the external changed light rays.

However, in the process of implementing the embodiments of the present application, the applicant finds out that photoreceptor mounting bases of the current outdoor lamps are all fixedly mounted, and therefore, the position and direction of the photoreceptor cannot be adjusted and the external changed light rays cannot be accurately received.

SUMMARY

In view of the preceding problems, embodiments of the present application provide a photoreceptor mounting base and a lamp, which can implement adjustment of the position and direction of a photoreceptor.

To solve the technical problems above, one technical solution adopted by the embodiments of the present application is a photoreceptor mounting base, which includes a housing and a rotation member. The housing is provided with a receiving cavity and an opening that communicates with the receiving cavity. The rotation member is received in the receiving cavity and is rotatably connected to the housing. The rotation member is configured to mount a photoreceptor, and a part of the photoreceptor is exposed to the opening.

Optionally, the housing includes an upper cover and a support, and the support and the upper cover are enclosed to form the receiving cavity;

the upper cover is provided with a first through hole; the first through hole communicates with the receiving cavity; and the first through hole includes the opening; and a first through slot is disposed on the support; the first through slot communicates with the receiving cavity; the rotation member is inserted at the first through slot; an outer surface of the rotation member is provided with a ring-shaped protrusion; the ring-shaped protrusion is carried between an end face of the support and the cover; and the rotation member is capable of rotating with respect to the support and the upper cover.

Optionally, the photoreceptor mounting base further includes a key; the support is provided with a receiving slot; the upper cover is provided with a second through hole; and the key is disposed in the receiving slot and is exposed to the second through hole, where the key is movable along the receiving slot;

the key is provided with a clamping slot; and the ring-shaped protrusion is received in the clamping slot; and when the key is in contact with the rotation member, the rotation member is fixed with respect to the support; and when the key is separated from the rotation member, the rotation member is rotatable with respect to the support.

Optionally, a periphery of the ring-shaped protrusion is provided with first teeth; and a sidewall of the clamping slot is provided with second teeth; and when the first teeth mesh with the second teeth, the rotation member is fixed with respect to the support; and when the first teeth are separated from the second teeth, the rotation member is rotatable with respect to the support.

Optionally, the photoreceptor mounting base further includes an elastic member, with an end abutting against an inner wall of the receiving slot of the support and the other end connected to the key, and the elastic member is configured to generate an elastic force for keeping the key away from the receiving slot.

Optionally, the photoreceptor mounting base further includes a bottom plate; a part of the rotation member is connected to the bottom plate after passing through a first through slot of the support; and the bottom plate and the rotation member are rotatable with respect to the support.

Optionally, the photoreceptor mounting base further includes a sliding block; an end face of the support facing the bottom plate is provided with a sliding slot; the sliding block is received in the sliding slot; and the sliding block is slidable in the sliding slot;

the bottom plate is provided with a baffle; and when the bottom plate rotates with the rotation member to a predetermined position, the baffle is abutted against the sliding block and plucks the sliding block to slide along the sliding slot until the sliding block is abutted against a sidewall of the sliding slot; and a numeral value of a length of the sliding block plus a thickness of the baffle is less than or equal to a half of a numeral value of a length of the sliding slot.

Optionally, an elastic piece is extended at the bottom plate; a ring-shaped gear is extended at an end face of the support facing the bottom plate; and the elastic piece is inserted in a gear slot of the ring-shaped gear.

Optionally, the photoreceptor mounting base further includes a first sealing ring and the first sealing ring is disposed between the support and the upper cover.

To solve the technical problems above, another technical solution adopted by the embodiments of the present application is: a lamp, including a controller, a light source, a photoreceptor, and the photoreceptor mounting base of any one above, where the photoreceptor is mounted at the photoreceptor mounting base; the photoreceptor is in signal connection to the controller; and the controller controls the light source according to a signal emitted by the photoreceptor.

BRIEF DESCRIPTION OF DRAWINGS

To illustrate the technical solutions in the specific embodiments of the present application or the prior art more clearly, accompanying drawings required in the specific embodiments or descriptions of the prior art are simply introduced below. In all the accompanying drawings, similar components or parts are generally marked using similar reference numerals.

REFERENCE NUMERALS

| | |
|---|---|
| 100 | Photoreceptor mounting base |
| 10 | Housing |
| 12 | Upper cover |
| 122 | First through hole |
| 124 | Second through hole |
| 14 | Support |
| 142 | First through slot |
| 144 | Receiving slot |
| 146 | Sliding slot |
| 148 | Ring-shaped gear |
| 20 | Rotation member |
| 22 | Ring-shaped protrusion |
| 222 | First tooth |
| 30 | Key |
| 32 | Clamping slot |
| 34 | Second tooth |
| 40 | Elastic member |
| 50 | Bottom plate |
| 52 | Baffle |
| 54 | Elastic piece |
| 60 | Sliding block |
| 70 | First sealing ring |
| 80 | Second sealing ring |
| 90 | Photoreceptor |

DESCRIPTION OF EMBODIMENTS

To facilitate the understanding of the present application, the present application would be described in more details with reference to the accompanying drawings and specific embodiments below. It should be noted that when a component is expressed as "being fixed to" another component, it may be directly on another component, or one or more middle components may exist therebetween. When a component is expressed as "being connected to" another component, it may be directly connected to another component, or one or more middle components may exist therebetween. Terms "perpendicular", "horizontal", "left", "right", and similar expressions are only used for the purpose of explanations.

Unless otherwise defined, all techniques and scientific terms used in this description have the same meanings as those generally understood by a person skilled in the technical field of the present application. The terms used in this description of the present application herein are only used for the purpose of describing a specific embodiment, rather than limiting the present application. A term "and/or" used in this description includes any or all combinations of one or more related and listed items.

Figure 1:
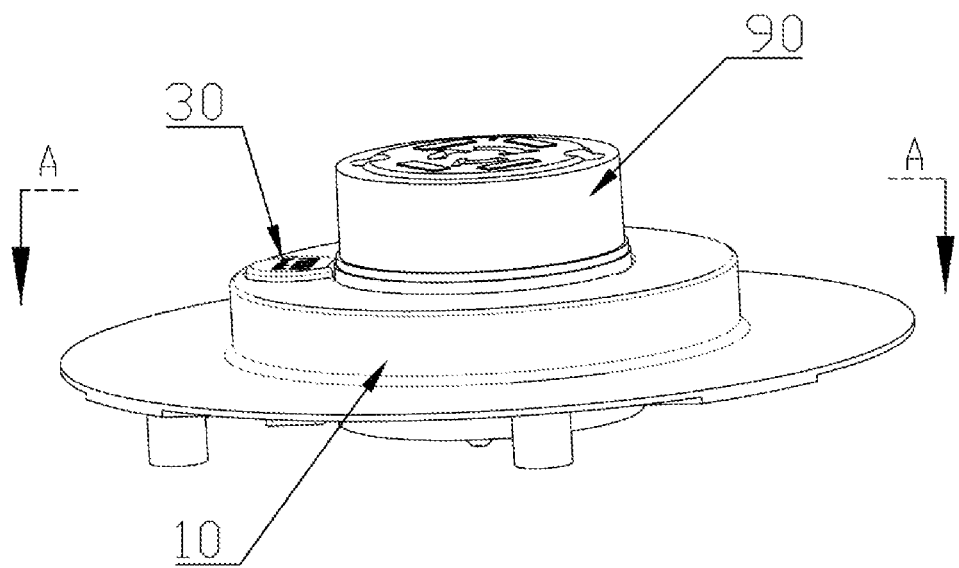
FIG. 1 is a schematic diagram of a photoreceptor mounting base provided by an embodiment of the present application.

To solve the technical problems above, a technical solution adopted by the embodiments of the present application relates to: a photoreceptor mounting base 100 as shown in FIG. 1.

Figure 2:
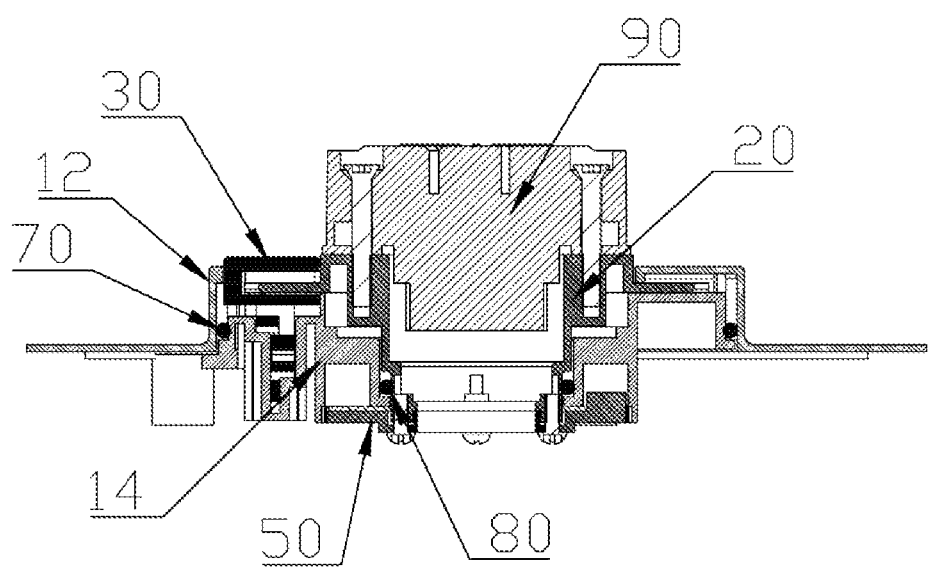
FIG. 2 is a sectional view of FIG. 1 in direction A.
Figure 3:
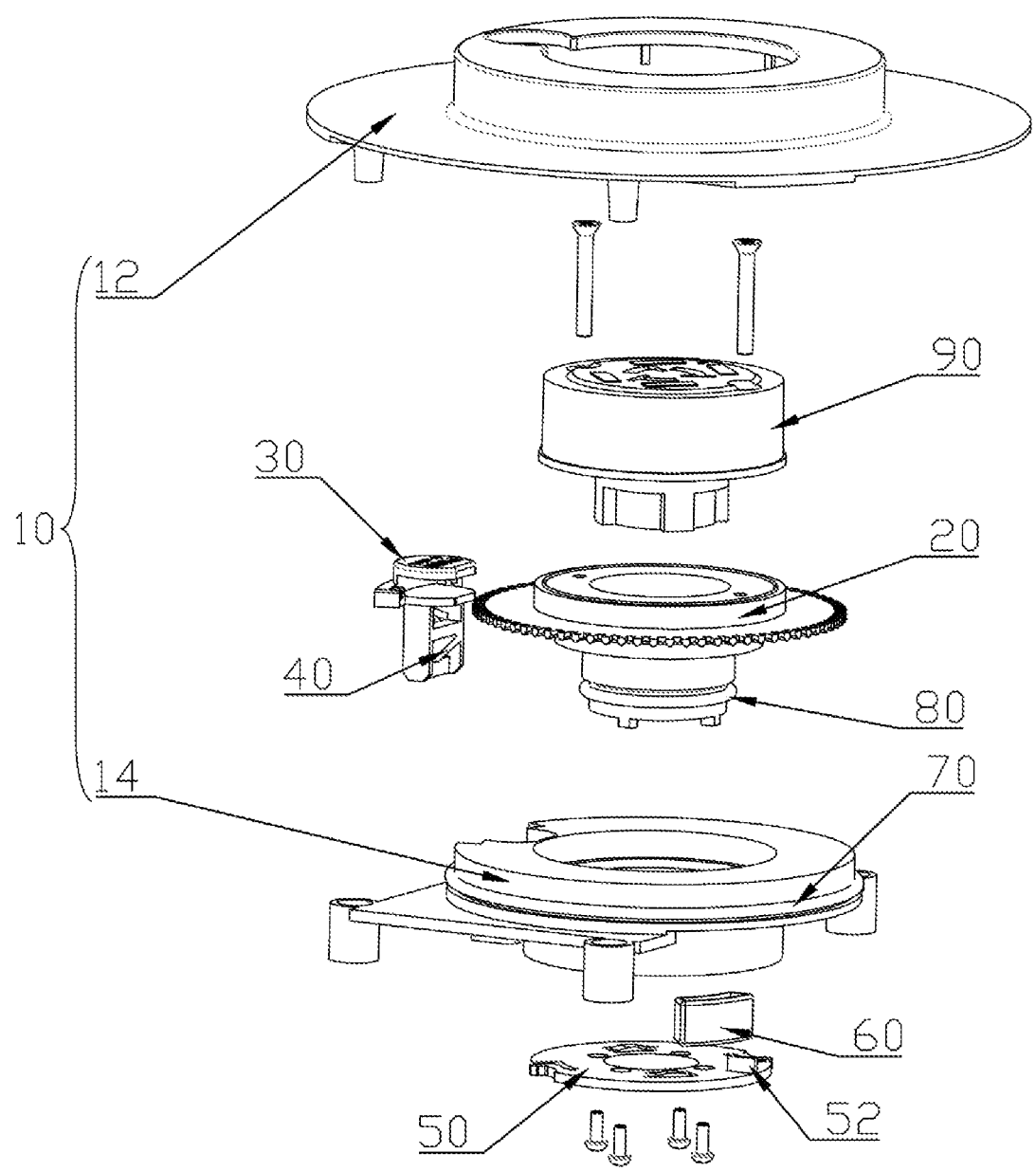
FIG. 3 is an exploded view of an angle of a photoreceptor mounting base provided by an embodiment of the present application.

With reference to FIG. 2 and FIG. 3, the photoreceptor mounting base 100 includes a housing 10, a rotation member 20, a key 30, an elastic member 40, a bottom plate 50, a sliding block 60, and a first sealing ring 70. The rotation member 20 is disposed in the housing 10. The rotation member 20 is used for mounting a photoreceptor 90 and a part of the photoreceptor 90 is exposed outside the housing 10 to receive external light rays, where the exposed part of the photoreceptor 90 is provided with a photoreceptive head; the photoreceptive head is the part of the photoreceptor 90 to receive the external light rays; the key 30 is disposed on the housing 10; the key 30 can be separated from or in contact with the rotation member 20; when the key 30 is in contact with the rotation member 20, the rotation member 20 cannot rotate, i.e., the photoreceptor 90 mounted on the rotation member 20 cannot rotate; when the key 30 is separated from the rotation member 20, the key 30 can rotate; the elastic member 40 is connected to the housing 10 and the key 30; the elastic member 40 is used for generating an elastic force for keeping the key 30 away from the housing 10; the bottom plate 50 is connected to an end of the rotation member 20 that passes through a movable member; the sliding block 60 is disposed between the housing 10 and the rotation member 20; and the first sealing ring 70 is disposed inside the housing 10.

Figure 4:
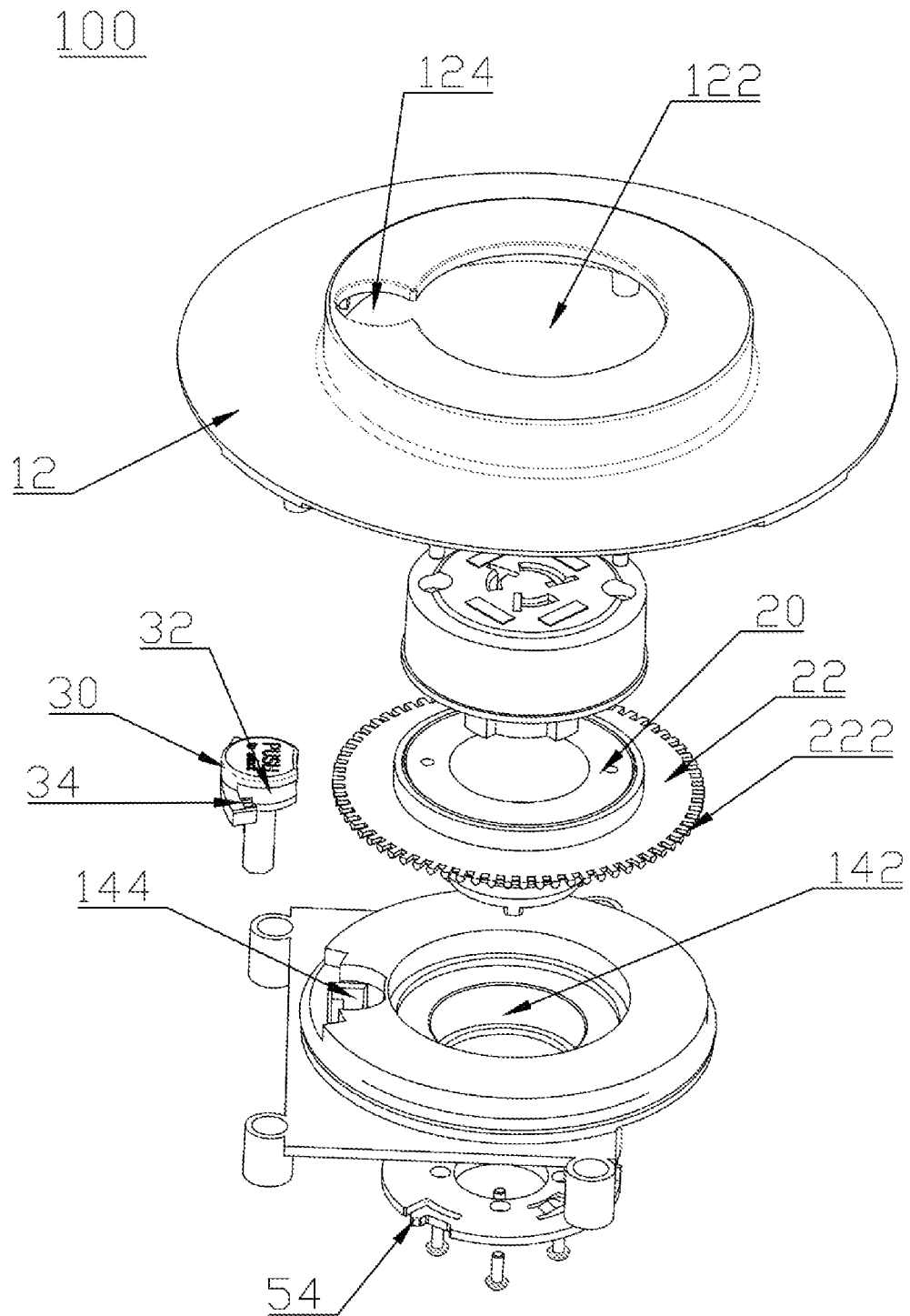
FIG. 4 is an exploded view of another angle of a photoreceptor mounting base provided by an embodiment of the present application.
Figure 5:
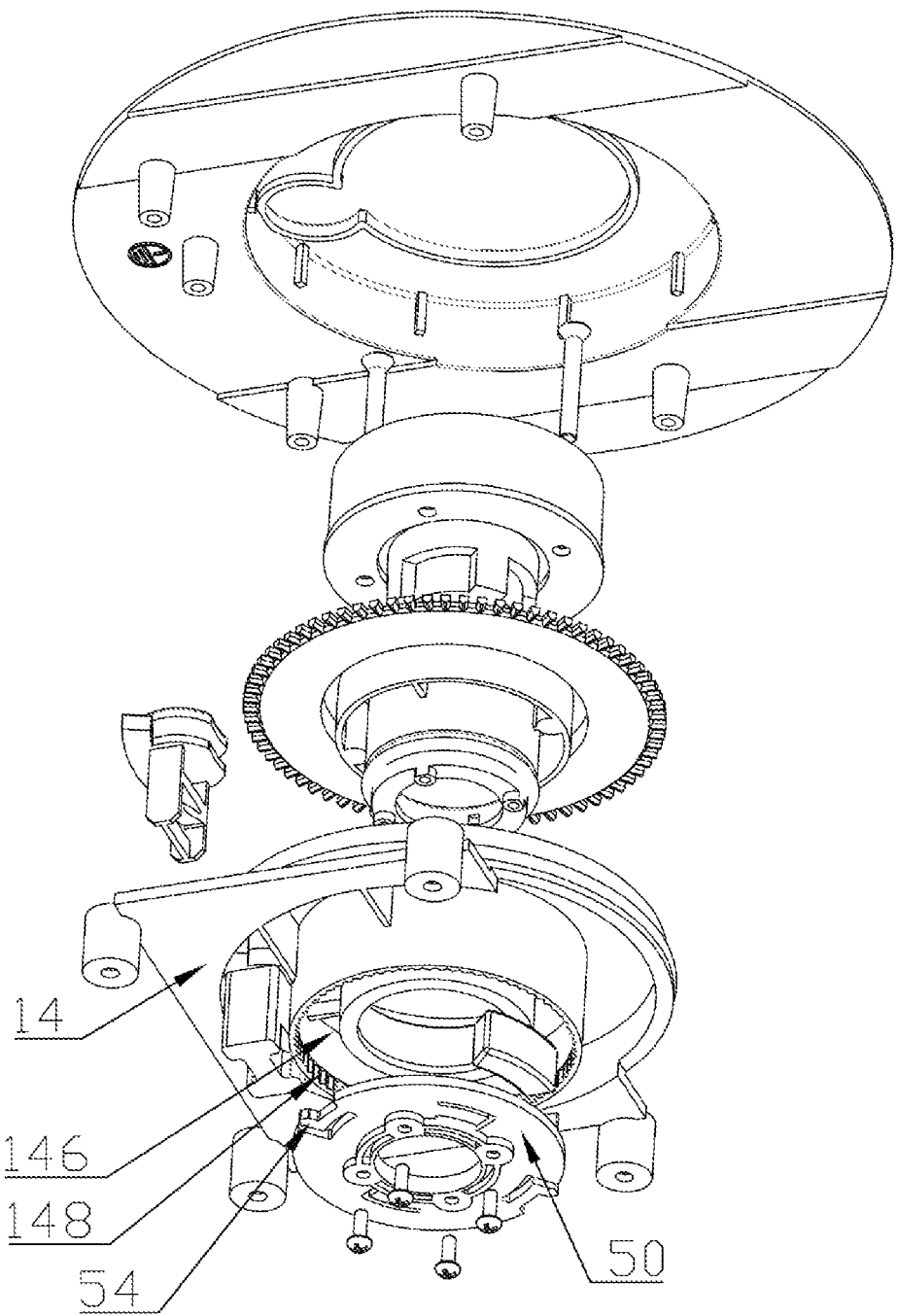
FIG. 5 is an exploded view of a further angle of a photoreceptor mounting base provided by an embodiment of the present application.

For the housing 10 above, with reference to FIG. 3, FIG. 4, and FIG. 5, the housing 10 includes an upper cover 12 and a support 14; the upper cover 12 is fixedly connected to the support 14; the upper cover 12 and the support 14 are enclosed to form a receiving cavity; and the receiving cavity is used for receiving the rotation member 20 and the photoreceptor 90. The upper cover 12 is provided with a first through hole 122 and a second through hole 124. The first through hole 122 and the second through hole 124 both communicate with the receiving cavity. The first through hole 122 is used for a part of the photoreceptor 90 to extend out to be exposed outside the housing 10. The second through hole 124 is used for the key 30 to be exposed outside the housing 10 for pressing. A first through slot 142 is disposed at the support 14. The first through slot 142 communicates with the receiving cavity. The first through slot 142 is used for the rotation member 20 to be inserted, and a part of the rotation member 20 passes through the first through slot 142 and then is connected to the bottom plate 50. A receiving slot 144 is further disposed at the support 14. The receiving slot 144 is used for receiving the key 30, and the key 30 can move up and down along the receiving slot 144. An end face of the support 14 facing the bottom plate 50 is provided with a sliding slot 146. The sliding slot 146 is used for receiving the sliding block 60 and for the sliding block 60 to slide. A ring-shaped gear 148 extends at the end face of the support 14 that faces the bottom plate 50. The ring-shaped gear 148 cooperates with the bottom plate 50, to generate vibration and sound during the rotation of the rotation member 20.

It should be noted that the photoreceptor mounting base 100 is mainly disposed at an external carrier such as a lamp. In the descriptions of this embodiment, the upper cover 12 is explained as an independent part; it can be understood that the upper cover 12 of this embodiment may be a partial structure of the external carrier such as a lamp, for example, a housing.

For the rotation member 20 above, with reference to FIG. 3 and FIG. 4, the rotation member 20 is inserted in the first through slot 142 of the support 14. The rotation member 20 can rotate with respect to the support 14 and the upper cover 12. The rotation member 20 is used for mounting the photoreceptor 90. An outer surface of the rotation member 20 is provided with a ring-shaped protrusion 22. The ring-shaped protrusion is carried between an end face of the support 14 and the upper cover 12. An end of the rotation member 20 passes through the first through slot 142 and is then connected to the bottom plate 50. The bottom plate 50 and the ring-shaped protrusion limit the rotation member 20 on the support 14, so that the rotation member 20 can rotate with respect to the support 14, but cannot move parallel to the axis of the first through slot 142. The periphery of the ring-shaped protrusion is provided with first teeth 222. The first teeth 222 are circumferentially distributed on the ring-shaped protrusion 22.

For the key 30, still referring to FIG. 3 and FIG. 4, the key 30 is disposed in the receiving slot 144 of the support 14 and is exposed to the second through hole 124 of the upper cover 12. The key 30 can move along the receiving slot 144, i.e., the key 30 can move through pressing. The key 30 is provided with a clamping slot 32. The clamping slot 32 is used for receiving a part of the ring-shaped protrusion 22 of the rotation member 20. A sidewall of the clamping slot 32 is provided with second teeth 34. The second teeth 34 mesh with the first teeth 222 of the ring-shaped protrusion 22. When the first teeth 222 mesh with the second teeth 34, the rotation member 20 is fixed with respect to the support 14. In this case, the photoreceptor 90 is fixed and cannot rotate; pressing the key 30 can implement the separation between the second teeth 34 and the first teeth 222; when the second teeth 34 are separated from the first teeth 222, the rotation member 20 can rotate with respect to the support 14; and in this case, the photoreceptor 90 can rotate to adjust the position and direction.

For the elastic member 40 above, still referring to FIG. 3 and FIG. 4, an end of the elastic member 40 abuts against an inner wall of the receiving slot 144 of the support 14 and the other end thereof is connected to the key 30, and the elastic member 40 is used for generating an elastic force for keeping the key 30 away from the receiving slot 144. When the key 30 is pressed, the elastic member 40 is compressed. In this case, the position and direction of the photoreceptor 90 can be adjusted. When the key 30 is no longer pressed, under the function of the elastic force generated by the elastic member 40 to keep the key 30 away from the support 14, the key 30 makes a reset motion, the second teeth 34 mesh with the first teeth 222 again, and the rotation member 20 is fixed, and cannot further adjust the position and direction of the photoreceptor 90.

In this embodiment, the elastic member 40 is an elastic sheet disposed on the key 30. The elastic sheet acts on an inner wall of the receiving slot 144 to generate the elastic force for the key 30. As can be understood, in some other embodiments, the elastic member 40 may be another structure, such as a spring.

For the bottom plate 50, with reference to FIG. 3, FIG. 4, and FIG. 5, the bottom plate 50 is connected to an end of the rotation member 20 that passes through the bottom plate 50; and the bottom plate 50 is provided with a baffle 52. When the rotation member 20 rotates in a first direction, the bottom plate 50 rotates with the rotation member 20 to a certain position, and the baffle 52 starts to abut against the sliding block 60 and plucks the sliding block 60 to slide in the sliding slot 146 of the support 14 in the first direction until the sliding block 60 abuts against a sidewall of the sliding slot 146, and therefore, the rotation member 20 cannot further rotate in the first direction. In this case, the rotation member 20 may rotate along a second direction opposite to the first direction; after rotating by a certain angle, the baffle 52 abuts against the sliding block 60 again and plucks the sliding block 60 to slide along the second direction until the sliding block 60 is abutted against the other sidewall of the sliding slot 146. Hence, to ensure the angle by which the rotation member 20 can rotate reaches 360 degrees, a numeral value of a length of the sliding block 60 plus a thickness of the baffle 52 needs to be less than or equal to a half of a numeral value of a length of the sliding slot, i.e., the numeral value of a travel distance of the sliding block 60 in the sliding slot 146 must be greater than or equal to two times of the numeral value of the length of the sliding block 60 itself plus the thickness of the baffle 52. Similarly, if the sliding slot 146 is a ring-shaped sliding slot 146, and the sliding block 60 is an arc-shaped sliding block 60, the numeral number of the arc length of the sliding slot 146 needs to be greater than or equal to two times of the numeral value of the arc length of the sliding block 60 plus the thickness of the baffle 52.

An elastic piece 54 further extends at the bottom plate 50. The elastic piece 54 is inserted in the gear slot of the ring-shaped gear 148. The elastic piece 54 cooperates with the ring-shaped gear 148 to generate vibration and sound during the rotation of the rotation member 20 so as to generate a vibration feedback and a sound feedback to a human hand when the human hand rotates the photoreceptor 90.

For the first sealing ring 70 above, with reference to FIG. 3, the first sealing ring 70 is disposed between the support 14 and the upper cover 12 to seal the support 14 and the upper cover 12. In some embodiments, the photoreceptor mounting base 100 further includes a second sealing ring 80. The second sealing ring 80 is located in the first through slot 142 and disposed between the rotation member 20 and the support 14 for sealing both.

To facilitate understanding of the embodiments of the present application by a reader, a use process of the photoreceptor mounting base 100 is described as follows:

The photoreceptor mounting base 100 is disposed on the lamp. The photoreceptor 90 is mounted on the photoreceptor mounting base 100. In a general state, the position and direction of the photoreceptor 90 are fixed and cannot be adjusted. When the photoreceptor 90 needs to be adjusted, the key 30 is manually pressed. The second teeth 34 of the key 30 are separated from the first teeth 222 of the rotation member 20, and then the photoreceptor 90 is manually rotated. A photoreceptive lens disposed at the end face or side of the photoreceptor 90 can rotate around the axis of the photoreceptor 90 by 360 degrees. During the rotation process, the elastic piece 54 of the bottom plate 50 cooperates with the ring-shaped gear 148 of the support 14, to generate feedback vibration and sound for rotation, so that a user can control the force and angle of rotation better. After the photoreceptor 90 is well adjusted, the key 30 is no longer pressed. Under the resetting function of the elastic member 40, the second teeth 34 of the key 30 mesh with the first teeth 222 of the rotation member 20 again. The rotation member 20 is fixed and the position and direction of the photoreceptor 90 are also fixed.

The embodiments of the present application provide a photoreceptor mounting base 100 and a lamp. The photoreceptor mounting base 100 includes a housing 10 and a rotation member 20. The housing 10 is provided with a receiving cavity and an opening that communicates with the receiving cavity. The rotation member 20 is received in the receiving cavity and is rotatably connected to the housing 10. The rotation member 20 is used for mounting a photoreceptor 90, and a part of the photoreceptor 90 is exposed to the opening. Through the rotation of the rotation member 20, the rotation of the photoreceptor 90 can be implemented; a photoreceptive lens disposed on a part of the photoreceptor 90 exposed to the opening can rotate around an axis of the rotation member 20, so as to implement accurate induction of changing light rays outside by the photoreceptor 90.

To solve the technical problems above, another technical solution adopted by the embodiments of the present application is: a lamp, including a controller, a light source, a photoreceptor 90, and the photoreceptor mounting base 100 as stated above, where the photoreceptor 90 is mounted at the photoreceptor mounting base 100; the photoreceptor 90 is in signal connection to the controller; and the controller controls the light source according to a signal emitted by the photoreceptor 90.

The above described are only embodiments of the present application, and do not therefore limit the patent scope of the present application. Any equivalent structure or equivalent process change made using the contents of the description and the accompanying drawings of the present application is directly or indirectly applied to other related technical field and shall fall within the patent protection scope of the present application.

What is claimed is:

1. A photoreceptor mounting base, comprising:
   a housing, provided with a receiving cavity and an opening that communicates with the receiving cavity;
   a rotation member, received in the receiving cavity, rotatably connected to the housing, and configured to mount a photoreceptor, wherein a part of the photoreceptor is exposed to the opening; and
   a key;
   wherein the housing comprises an upper cover and a support, and the support and the upper cover are enclosed to form the receiving cavity;
   the upper cover is provided with a first through hole; the first through hole communicates with the receiving cavity; and the first through hole comprises the opening; and
   a first through slot is disposed on the support; the first through slot communicates with the receiving cavity; the rotation member is inserted at the first through slot; an outer surface of the rotation member is provided with a ring-shaped protrusion; the ring-shaped protrusion is carried between an end face of the support and the cover; and the rotation member is capable of rotating with respect to the support and the upper cover;
   the support is provided with a receiving slot; the upper cover is provided with a second through hole; the key is disposed in the receiving slot and is exposed to the second through hole, wherein the key is movable along the receiving slot; the key is provided with a clamping slot; and the ring-shaped protrusion is received in the clamping slot; and
   when the key is in contact with the rotation member, the rotation member is fixed with respect to the support; and when the key is separated from the rotation member, the rotation member is rotatable with respect to the support.

2. The photoreceptor mounting base according to claim 1, wherein a periphery of the ring-shaped protrusion is provided with first teeth; and a sidewall of the clamping slot is provided with second teeth; and
   when the first teeth mesh with the second teeth, the rotation member is fixed with respect to the support; and when the first teeth are separated from the second teeth, the rotation member is rotatable with respect to the support.

3. The photoreceptor mounting base according to claim 1, further comprising an elastic member, with an end abutting against an inner wall of the receiving slot of the support and the other end connected to the key, wherein the elastic member is configured to generate an elastic force for keeping the key away from the receiving slot.

4. The photoreceptor mounting base according to claim 1, further comprising a bottom plate, wherein a part of the rotation member is connected to the bottom plate after passing through a first through slot of the support; and the bottom plate and the rotation member are rotatable with respect to the support.

5. The photoreceptor mounting base according to claim 4, further comprising a sliding block, wherein an end face of the support facing the bottom plate is provided with a sliding slot; the sliding block is received in the sliding slot; and the sliding block is slidable in the sliding slot;
   the bottom plate is provided with a baffle; and when the bottom plate rotates with the rotation member to a predetermined position, the baffle abuts against the sliding block and plucks the sliding block to slide along the sliding slot until the sliding block abuts against a sidewall of the sliding slot; and
   a numeral value of a length of the sliding block plus a thickness of the baffle is less than or equal to a half of a numeral value of a length of the sliding slot.

6. The photoreceptor mounting base according to claim 5, wherein an elastic piece is extended at the bottom plate; a ring-shaped gear is extended at an end face of the support facing the bottom plate; and the elastic piece is inserted in a gear slot of the ring-shaped gear.

7. The photoreceptor mounting base according to claim 1, further comprising a first sealing ring disposed between the support and the upper cover.

8. A lamp, comprising a controller, a light source, a photoreceptor, and the photoreceptor mounting base according to any one of claims 1 and 2 to 7, wherein the photoreceptor is mounted at the photoreceptor mounting base; the photoreceptor is in signal connection to the controller; and the controller controls the light source according to a signal emitted by the photoreceptor.

* * * * *